INVENTORS
NILS EMIL NILSSON
GUSTAV OSCAR RODNERT
JOHN CARL HAROLD BJÖRK
BY [signature]
ATTORNEY Jan. 27, 1959 N. E. NILSSON ET AL 2,871,299

AUTOMATIC TELEPHONE SYSTEM

Filed May 2, 1956 4 Sheets-Sheet 2

INVENTORS
NILS EMIL NILSSON
GUSTAV OSCAR RODNERT
JOHN CARL HAROLD BJÖRK
BY [signature]
ATTORNEY INVENTORS
NILS EMIL NILSSON
GUSTAV OSCAR RODNERT
JOHN CARL HAROLD BJÖRK
BY Andrew E. Harz
ATTORNEY

AUTOMATIC TELEPHONE SYSTEM

Filed May 2, 1956 4 Sheets-Sheet 4

INVENTORS
NILS EMIL NILSSON
GUSTAV OSCAR RODNERT
JOHN CARL HAROLD BJÖRK
BY [signature]
ATTORNEY United States Patent Office 2,871,299

Patented Jan. 27, 1959

2,871,299

AUTOMATIC TELEPHONE SYSTEM

Nils Emil Nilsson, Stockholm, Gustav Oscar Rodnert, Hagersten, and John Carl Harold Björk, Stockholm, Sweden, assignors to Telefonaktiebolaget L M Ericsson, Stockholm, Sweden, a corporation of Sweden Application May 2, 1956, Serial No. 582,220

Claims priority, application Sweden May 18, 1955

3 Claims. (Cl. 179—22)

This invention relates to a connecting device for sending ringing signals in an automatic telephone system comprising subscriber's lines, cross bar switches, link circuits and registers and a marker, which is set from the registers and sets up communications between the subscriber's lines over operating bars in the cross bar switches. The telephone system is furthermore of such a kind where the communications are set up by the calling wires of a calling and a called subscriber's line being connected to two metallic conductors associated with one of the link circuits. By this switching operation it is achieved that the link circuits obtain only one set of terminals, to which both calling and called subscriber's lines are connected. This causes simplified switching operations but requires special measures during the sending of ringing signals to the called line so as not to disturb the calling person.

This problem has been solved heretofore by holding the line relay of the calling subscriber's line until the called person answers.

The invention relates to another arrangement for solving the problem of sending repeated ringing signals to the called subscriber until an answer is obtained without disturbing the calling subscriber and this is achieved in such telephone plants having cross bar switches, which contain links, whereby operating bars for cross bar switches, forming a first selection stage, interconnect the subscriber's lines with said links and operating bars for cross bar switches, forming a second selection stage, interconnect the links with the link circuits, by providing a control relay for each of said links, which relay is operated by the marker only when a calling subscriber's line is connected to the link over said first selection stage, and which operates on one hand a break contact interrupting one talking wire of the communication, on the other hand a make contact closing a circuit containing at least one winding on the relay and the loop of the calling subscriber's line for holding the relay in an operated position in dependence on the telephone instrument of the calling subscriber, and by further providing a relay, which is insensitive to ringing current in each circuit, and circuits in the link circuit which are closed when a calling and a called subscriber's line, each over its link, are connected to the link circuit and connect the talking wire, which is broken by said break contact in the calling link, to a ringing current generator in series with a winding on said relay, which is insensitive to ringing current, and a direct current source for the emission of ringing signals on the called subscriber's line, and by contacts on said relay, which is insensitive to ringing current, which contacts are operated when the loop over the called subscriber's line when answered is closed for direct current, and on one hand break the ringing current, on the other hand switch a circuit causing resetting of the communication over said talking wire which is broken during the ringing signals.

The invention will be described more in detail by means of the annexed drawings, Figs. 1–5.

Figure 1:
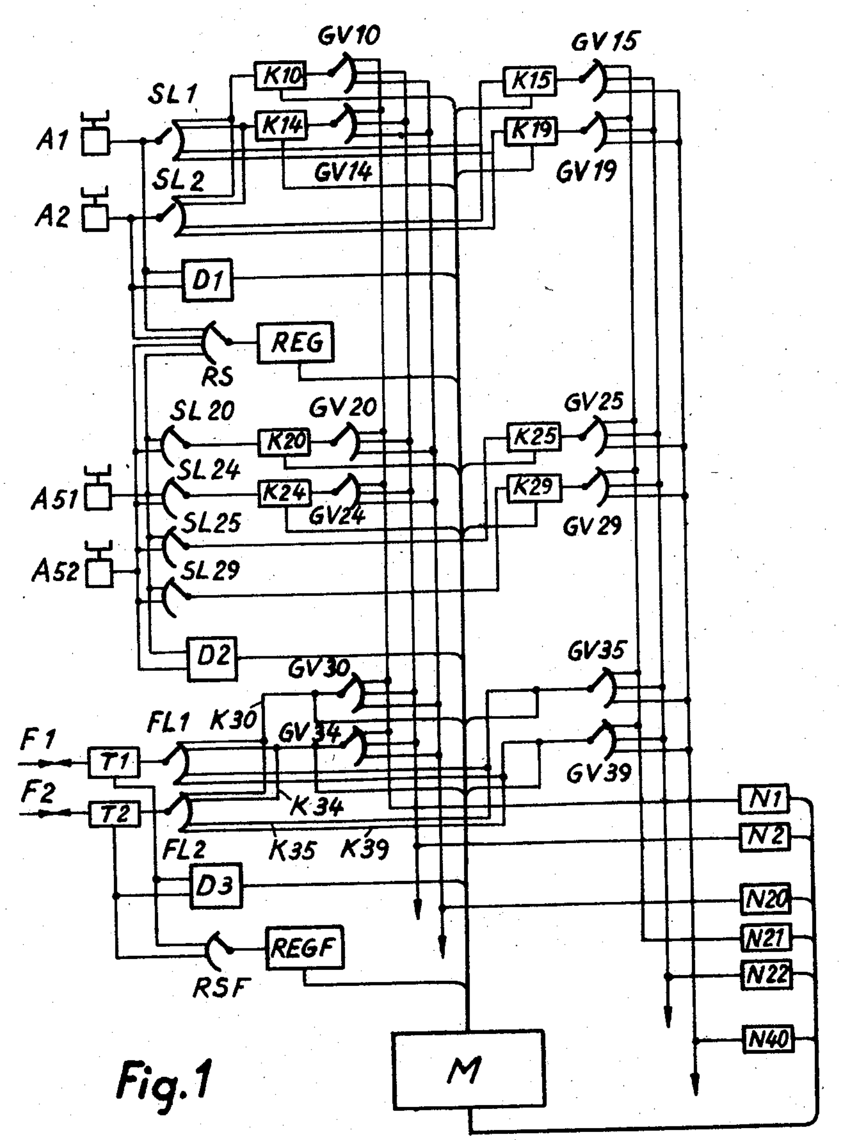
Fig. 1 shows a circuit diagram of a telephone system according to the invention.

Fig. 1 shows two groups of subscriber's instruments A1—A2 and A51—A52. In the first mentioned group each subscriber's line has a selector SL1—SL2. The second group includes a number of selectors SL20—SL29. It is not significant in the system of the invention whether a selector per line or line finder may come into use. The selectors SL1—SL2 connect the subscriber's lines of A1—A2 to links K10—K19 and selectors GV10—GV19 connect the links K10—K19 to link circuits N1—N40. The line finders SL20—SL29 connect the subscriber's lines of A51—A52 to the links K20—K29 and the selectors GV20—GV29 connect the links K20—K29 to the link circuits N1—N40. Further groups of subscribers may be connected over links to the link circuits N1—N40. In the figure is further shown a group of junction lines F1—F2 having line equipments T1—T2, which over selectors FL1—FL2 are connected to links K30—K39. The links K30—K39, which have no relay sets, are connected over selectors GV30—GV39 to the link circuits N1—N40. The link circuits are divided into two groups N1—N20 and N21—N40. Each group of link circuits contains a definite number of link circuits, e. g., 20, and the number of groups of link circuits may be increased, when the number of subscriber's groups is increased, by dividing the number of links per subscriber's group into more groups. The number of links per subscriber's group may be varied according to the need of the traffic. The number of link circuits per group is determined by the capacity of the selectors GV.

Each group of lines has access to a number of registers REG and REGF, respectively, over register selectors RS and RSF. For each group of lines there is further provided an identifier D1—D3, which after signal from one of the registers transmits the number of the line connected to the register to the marker M. A call from the instrument A1 causes that the instrument is connected to a register REG over a register selector RS. The subscriber dials the number of the called line, e. g. A51 on his dial, whereafter the register is connected to the marker M and sends a signal to the identifier D1, which transmits the number of the instrument A1 to the marker M. At the same time the called number is transmitted from the register REG to the marker M and then the marker selects a link circuit, e. g. N1 and two links, e. g. K10 and K20, set the selectors SL1 and GV10 and SL20 and GV20 so that a communication is obtained from A1 over SL1, K10, GV10, N1, GV20, K20 and SL20 to A51.

Figure 2:
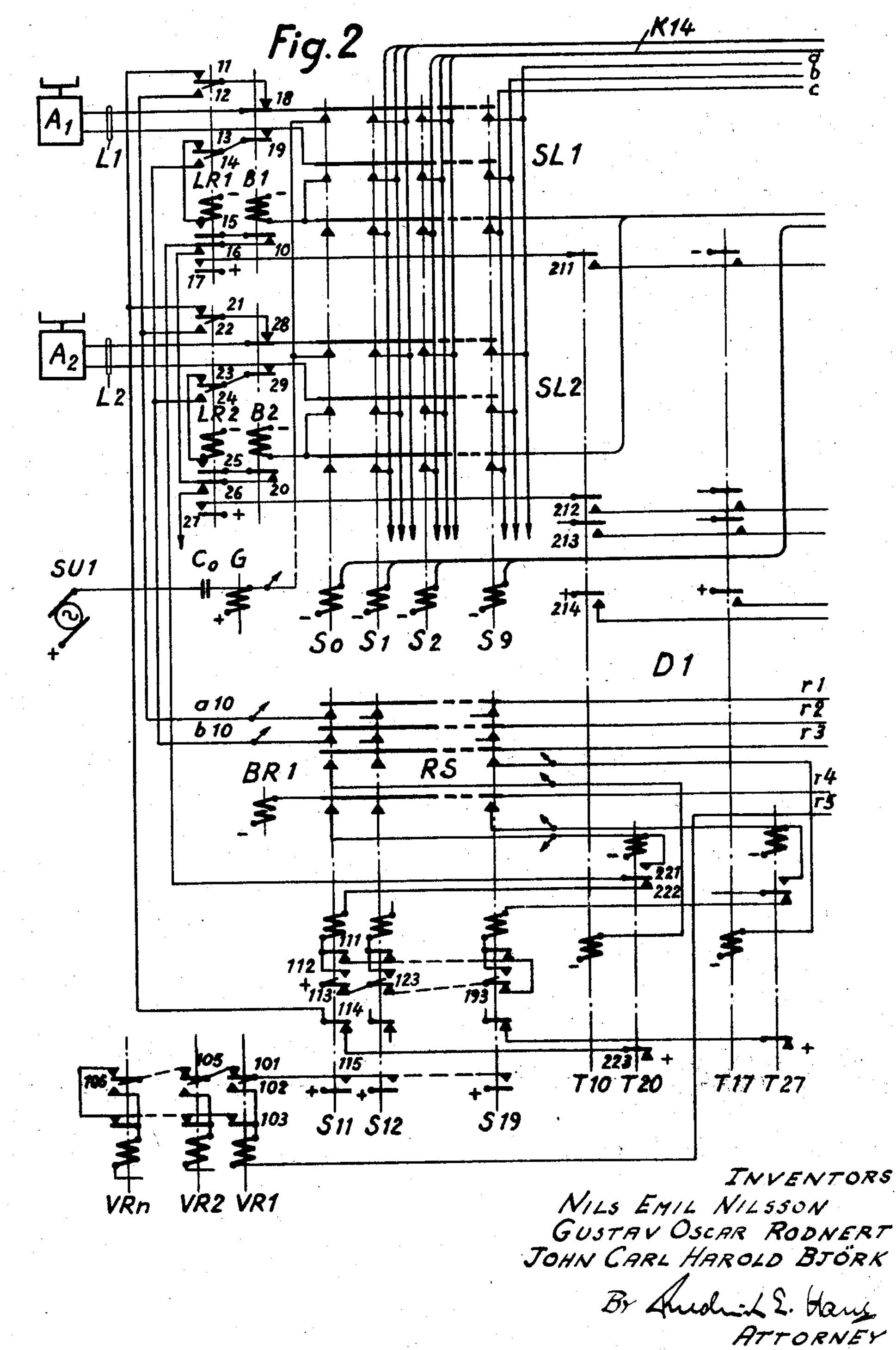
Fig. 2 shows the line equipment for two subscriber's lines and a register RS.
Figure 3:
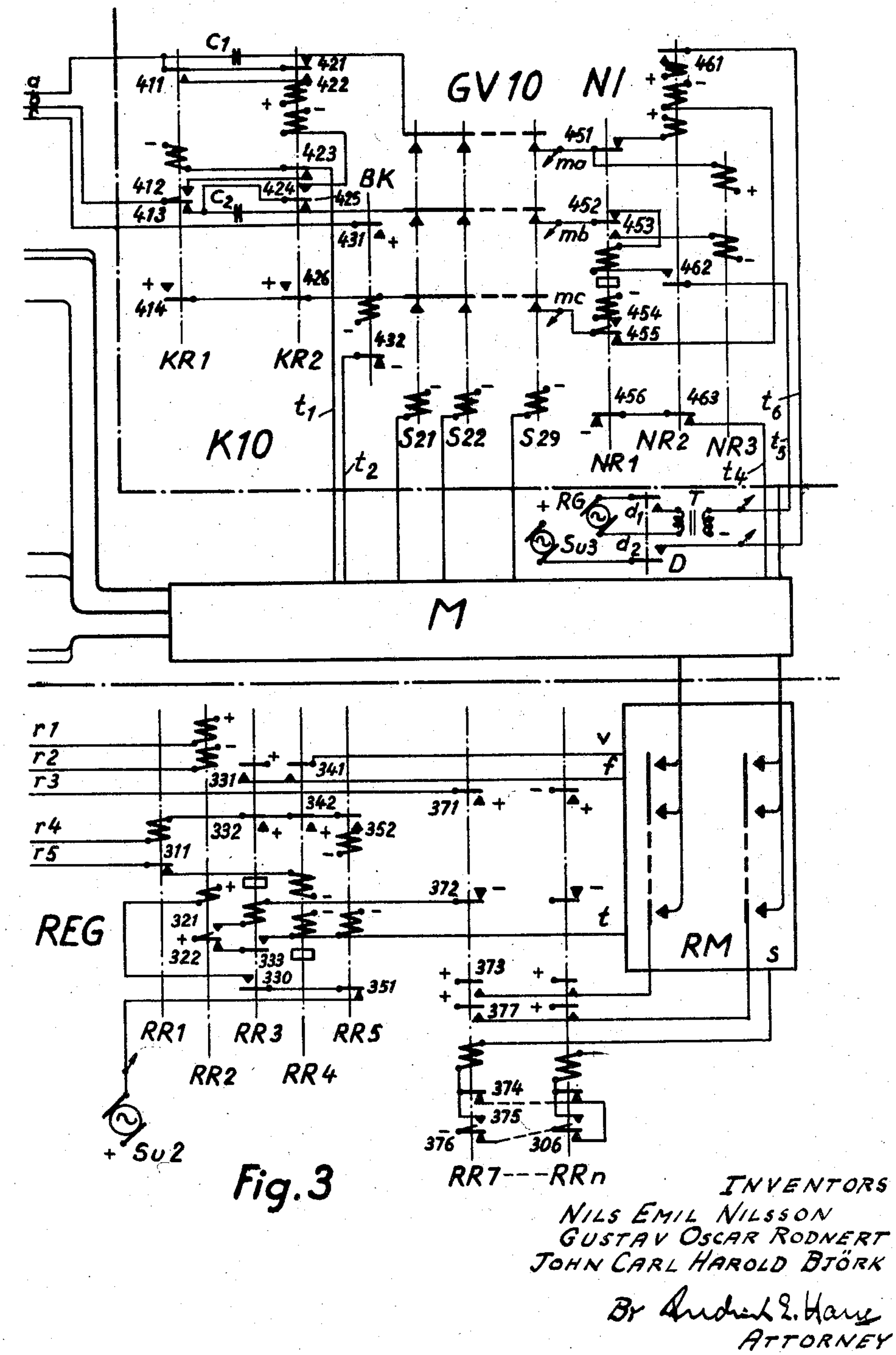
Fig. 3 shows above a link K10 and a link circuit N1 and a selector CV10 connecting them, and below a register REG.

Figs. 2–3 show a detailed switching operation within a private branch exchange having 2-digit subscriber's numbers. Each subscriber's line, e. g. L1, as a line relay LR1 and a selector SL1 consisting of an operating bar in a cross bar switch having an operating magnet B1. For the register connection a special system is used, viz. that the line relays LR1, LR2 and so on pertaining to the same tens number, form a chain, in which only one relay at a time may be operated. For each tens number there is one position in the multiple of the register unit RS. As a result, within each tens only one subscriber at a time may be connected to a register, which means a slight disadvantage but affords the advantage that savings are afforded in the register unit and simplifications of the identifying of the number of a calling instrument. The relays T10—T17 and T20—T27 in Fig. 2 form an identifying device.

When a subscriber calls from the instrument A1 in Fig. 2 the following circuit is closed: +, contacts 223, 114, 11 and 18, the line L1 and the instrument A1, contacts 19 and 13, the winding on the line relay LR1, to minus. The relay LR1 attracts its armature and operates the contacts and 14 to two wires a10 and b10 common for the tens, said wires being connected to contacts in the register unit RS. The relay LR1 is held in the following circuit: +, contact 113, 123—193, 11, the winding on the selecting magnet 811, contacts 222, 10 and 15, the winding on the relay LR1, to minus. The selecting magnet S11 attracts its armature and contacts 111—115 are actuated, contact 112 being closed before 111 and 113 are opened. The contact 115 closes the following circuit for all free registers, which may reach the wires a10 and b10: +, contacts 115, 101, 105—106, 103, the winding on the relay VR1, the wire r5, the contact 311, the upper winding of the relay RR4 to minus.

Each of the relays VR1–VRn pertains to a register REG and they form a relay chain, in which only one relay at a time can be operated. The relay VR1 is operated before the relay RR4, which is slow-operating. The contacts 101—103 are actuated, the contact 102 being closed before the contacts 101 and 103 are opened. The contacts 341—342 in Fig. 3 are closed. The following circuit is completed: +, the contact 342, the winding on the relay RR1, the wire r4, the winding on the operating magnet BR1, to minus. The operating magnet BR1 and the relay RR1 attract their respective armatures. The contact 311 is opened and the contacts in the register unit RS corresponding to the selecting magnet S11 are closed. The relay T20 in Fig. 2 is operated in a circuit in parallel with the operating magnet BR1. The contacts 221—223 are actuated, whereby the circuit of the selecting magnet S11 is broken. Then the calling circuit of the line relays LR1, LR2 and so on is held broken at the contact 223 and relay LR1 is held operated over the contact 221.

The relay RR2 in Fig. 3 is operated in the following circuit: +, the upper winding of the relay RR2, the wire r1, RS, the wire a10, the contacts 12 and 18, the line L1 and the instrument A1, the contacts 19 and 14, the wire b10, RS, the wire r2, the intermediate winding of the relay RR2, to minus. The contacts 321—322 are actuated. The slow operating holding relay RR3 becomes energized and operates the contacts 330—333. The calling person hears a tone which is sent from a generator Su2 over the contacts 351 and 330.

Let it be assumed that the call refers to the subscriber's instrument A2. The impulses are repeated by the relay RR2 and current impulses are sent over the contacts 322 and 333 and the wire t to a registering mechanism RM. At the beginning of the first impulse the relays RR4 and RR5 are operated. The relay RR5 disconnects the buzzer generator Su2 and is held over the contacts 342 and 352. The relay RR4 is slow operating and remains to the end of the impulse train. In a circuit over the contacts 331 and 341 and the wire v a switching device is operated, which is not shown in the figure but which in a known manner separates the impulse trains from each other, and in a circuit over the contact 331 and the wire f the registering is held in the register mechanism RM.

When the number of the instrument A2 has been registered in RM a circuit is closed for connection of the register REG to the marker M: +, the winding on relay RR7, the contacts 374, 306—376, to minus. Each of the relays RR7–RRn pertains to a register and they form a relay chain, in which only one relay at a time can be operated. It is assumed that the relay RR7 attracts its armature and operates the contacts 371—377, the contact 375 being closed before the contacts 374 and 376 are opened. The contact 372 breaks the current of the relay RR3. During the release time of the relay RR3 the switching operation for the switching of the communication is taking place.

The contact 371 closes a circuit for the relay T10 in Fig. 2 over the wire r3. The relay T10 operates the contacts 211—214. The number of the calling instrument A1 is identified by + over the contacts 17 and 211 and by + over the contact 214 and is registered in the marker M. At the same time the digits of the number of the instrument A2 are marked in the marker over the circuit, which is closed by the contacts 371 and 377 and which passes the registering mechanism RM. The marker M selects a free link circuit by means of a test circuit over the wire t4 and the contacts 463 and 456 to minus, and selects the free link circuit by operation of the corresponding selecting magnet S21—S29. It is assumed that the link circuit N1 is selected and the selecting magnet S29 is operated. Then the marker selects a free link, e. g. K10, by means of a test circuit over the wire t2 and the contact 432 and closes a circuit over the wire t2, the relay KR1 and then the operating magnet BK is operated. The contacts 411—414 and 431—432 and the contacts of the selector GV10 corresponding to the selecting magnet S29 are actuated. At the same time the selected link K10 in the selectors SL1—SL2 in Fig. 2 is marked by the selecting magnet S9 being operated. The marker M then closes a circuit for the operating magnet B1 of the selector SL1 in the calling subscriber's line L1. The operating magnet B1 attracts its armature. The contacts 18, 19 and 10 and the contacts on the operating bar SL1 corresponding to the selecting magnet S9 are actuated. Then B1 is held energized over the wire c and the contact 431. The marker M also tests the called line L2 and, if it is free, the marker selects a second link, e. g. K14 in Fig. 1, which is completely like the link K10 in Fig. 2. As now a called line is referred to, the relay KR1 in the link K14 is not operated but only the operating magnet BK of the selector GV14 pertaining to the link. Both links K10 and K14 are simultaneously connected to the multipled, metallic conductors ma, mb, mc in the link circuit N1. Then the relay NR2 is operated in a circuit over the contact 455, the wire mc, the selector GV10 and the contact 414. The contacts 461—463 are actuated. Then the selecting magnet S1 in Fig. 2 pertaining to the link K14 is operated and thereafter the operating magnet B2 of the selector SL2 pertaining to the subscriber's line L2. The operating magnet BK of the link K14 is held by the contact 414 in the link K10 over the conductor mc. The test of the line L2 occurs on the same wire as the operation of the operating magnet B2. Said wire marks busy if it is conncted to +, directly or over a resistance. Then the register REG and the marker M are released by the relay RR3 releasing its armature.

A communication has now been connected from the instrument A1 over the selector SL1, the link K10, GV10, the link circuit N1, GV14, the link K14, the selector SL2, to the instrument A2. The communication is held through the following circuit of the relay KR1: +, the lower winding of the relay NR2, the contact 451, GV10, contact 421, the wire a, the selector SL1, the line L1 and the instrument A1, the selector SL1, the wire b, the contacts 412 and 423, the winding on the relay KR1, to minus. The lower winding of the relay NR2 has a low resistance and has for its sole object to transmit a buzzer signal, which is sent from a generator Su3 over the contact d2 in an interrupter D, contact 461 and the upper winding of the relay NR2, in order to indicate for the calling person that a ringing signal is sent to the called instrument. The upper winding of the relay NR2 thus short-circuits the upper winding of the relay KR2, which is connected to the wire a over the contact 411.

Ringing signals are sent to the called instrument A2 through the following circuit: +, the lower winding of the relay NR2, the contact 451, the wire *ma*, the selector GV14, the *a*-wire of the link K14, the selector SL2, the line L2 and the instrument A2, the selector SL2, the *b*-wire of the link K14, the contacts 413 and 425 and the selector KV14 of the link K14, the wire *mb*, the contact 452, the upper winding of the relay NR1, the contact 462, the wire *t5*, the transformer T, to minus. Ringing signals are transformed to said circuit from the ringing generator RG over the contact *d1* in the interrupter D and the transformer T. The corresponding ringing circuit over the link K10 is broken by the contact 413, and thus the calling person is not disturbed by the ringing signals. The relay NR1 is slow operating and is not operated by the ringing current. When an answer is obtained from the called instrument A2 the ringing circuit for direct current is closed and the relay NR1 attracts its armature. The contacts 451—456 are actuated. The contact 454 is first closed and a circuit is completed through the lower winding of the relay NR1 over the wire *mc* and the contact 414. The contact 452 breaks the ringing current. The contact 451 disconnects the lower winding of the relay NR2 and then the relay KR2 is sufficiently energized by its upper winding for operating in series with the winding on the relay KR1. The contacts 421—426 are actuated. The contact 423 breaks the current through the relay KR1 which releases its armature. A feeding circuit is formed for the instrument A1 over the contact 422 through the upper winding of the relay KR2 and over the contacts 413 and 424 by the lower winding of the relay KR2. The condensers C1 and C2 are connected between the two subscriber's lines and the called instrument A2 is fed with current over the windings on the relay NR3.

The communication is held by the calling person and is disconnected when the calling subscriber lifts his handset.

If the called instrument A2 is busy the marker does not set up a communication but operates the selecting magnet S*o* in Fig. 2 and then the operating magnet B1 of the calling subscriber's line L1. The contacts 18, 19 and 10 and the contacts in the selector SL1 corresponding to the selecting magnet S*o* are actuated. When the register REG and the marker M are released, the operating magnet B1 is held in the following circuit: +, the winding on the choke G, the selector SL1, the line L1, the instrument A1, the selector SL1, the winding on the operating magnet B1, to minus. The calling person hears a buzzer tone sent from a generator S*u*1 over the condenser C*o* and indicating that the called instrument is busy.

In Fig. 3 there is the current feeding relay KR2 of the calling subscriber in the link K10 and the current feeding relay NR2 of the calling subscriber in the link circuit N1.

Figure 4:
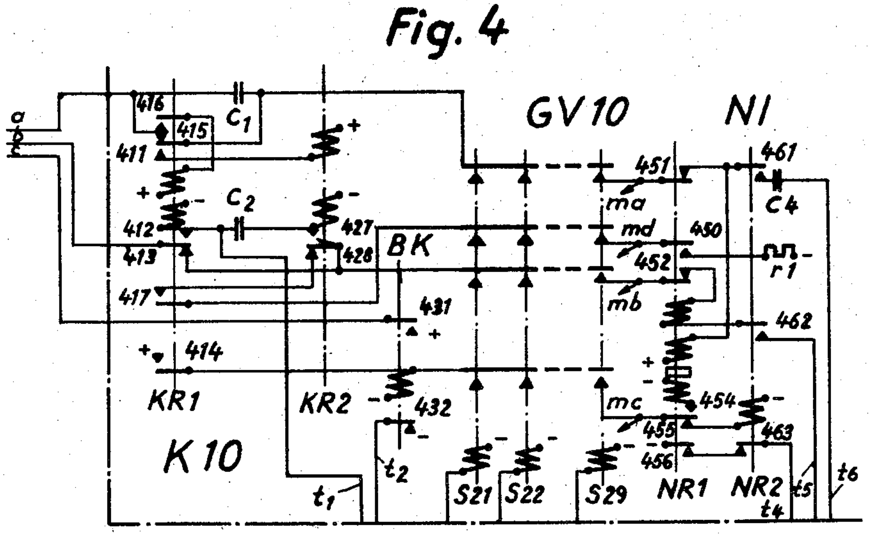
Figs. 4–5 show different embodiments for the link and the link circuit in Fig. 3.

Fig. 4 shows how the two current feeding relays may be arranged in the link K10 while only ringing signal relays and metallic conductors *ma, mb, mc* for interconnection of the subscriber's lines exist in the link circuit N1. The marker M operates the current feeding relay KR1 in the link K10 on the calling side by closing a circuit over the wire *t1*. The contacts 411—417 are actuated. The upper winding of the current feeding relay KR2 is connected in parallel with the intermediate winding on the ringing control relay NR1, which has a low resistance. When an answer is obtained, the relay NR1 is operated. The contacts 450—456 are actuated and the following circuit is completed: +, the upper winding of the relay KR2 in the link K10, GV10, the wire *ma*, GV14, the *a*-wire of the link K14, the loop and the selector S12 of the called instrument, the *b*-wire, GV14, the wire *mb*, GV10, the contacts 428 and 417 in the link K10, the contact in GV10, the wire *md*, the contact 450, the resistance *r*1, to minus. The relay KR2 in the link K10 is operated. The contacts 427—428 are actuated and then the subscriber's lines L1 and L2 are interconnected over the condensers C1 and C2 in the link K10. In Fig. 4 a buzzer tone is connected during the ringing signals over the wire *t6*, the condenser C4 and the contact 461 to the *a*-wire of the calling line.

Figure 5:
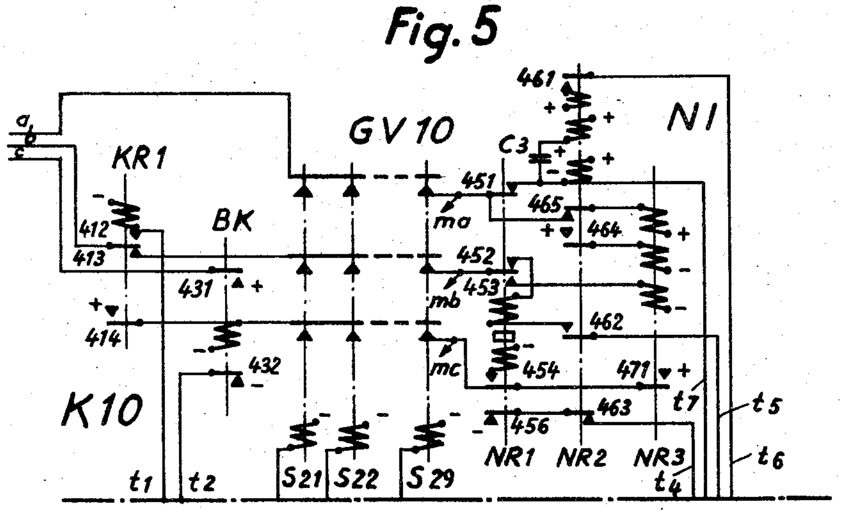

Fig. 5 shows a simplified embodiment for the links K10—K19. Each of the links contains a relay KR1, which is operated by the marker M, when a calling line is connected over the link to the link circuit M1. At the same time the marker operates the relay NR2 of the link circuit N1 in a circuit over the wire *t7*. The contacts 461—465 are actuated. When the marker is released, the relay KR1 is held in the following circuit: +, the lower winding of the relay NR2, the contact 451, the conductor *ma*, GV10, *a*-wire, the winding over the calling instrument A1, the *b*-wire, the contact 412, the winding on the relay KR1, to minus. The lower winding of the relay NR2 is in this case a working winding. Ringing signals are sent over the called line L2 through the wire *t5* and the contact 462. Buzzer signals are sent to the calling line L1 over the wire *t6* and the contact 461, are transformed between the upper two lines of the relay NR2, and pass an electrolytic condenser C3 and the contact 451 to the conductor *ma*. The intermediate winding of the relay NR2 has a low resistance and because of the electrolytic condenser C3 it is also passed by the ringing current over the called line, which however does not operate the relay NR2. The contact 464 closes a circuit through the intermediate winding of the relay NR3. The relay NR3 is operated and the contact 471 is closed. When the called person answers, the relay NR1 is operated. The contacts 451—456 are actuated. The circuit of the relay KR1 is broken by the contact 451 and is held broken during the release time of the relay NR2. The relay NR2 is slow releasing due to the electrolytic condenser C3, and therefore the relay KR1 releases its armature. The communication is held by the contact 471 and when the relay NR2 releases its armature the contact 465 is closed before the contact 464 is opened. The two subscriber's lines L1 and L2 are simultaneously connected to the conductors *ma* and *mb* and obtain a common current feeding over the upper and the lower winding of the relay NR3, which is held in an operated position until the two subscribers have raised their hand sets.

We claim:

1. In an automatic telephone system, in combination, subscriber's lines, links, single ended link-circuits, registers and a marker, primary switches for connecting said lines to said links, secondary switches associated with said links to connect the links to said link-circuits, two conductors in each of said link-circuits and connected speech wires, a control relay having a hold winding for each of said links operated by the marker in response to a calling subscriber's line being connected over the link to said conductors in a link-circuit, said marker connecting a called subscriber's line to said conductors in the same link-circuit over another link, said control relay operating a break contact, which breaks one speech wire and a make contact which closes a holding circuit including the hold winding of the control relay and the loop of the calling subscriber's line for holding the control relay in an operated position, a slow operating relay in each link-circuit, a ringing generator, said slow operating relays being connected between the ringing current generator and the conductor corresponding to the speech wire broken by said break contact on the calling side and being non-responsive to ringing current, a ringing signal being sent to the called subscriber's line from said generator, contacts on said slow-operating relay for disconnecting the said relay from said conductor and sending a signal to the link on the calling side, said slow operating relay being energized when the loop over the called subscriber's line is closed for direct current in response to an answer to actuate said relay contacts, said signal resetting the communication over said broken speech wire.

2. An automatic telephone system according to claim 1 further comprising a current feeding relay and two condensers one in each speech wire for each of said links, break contacts on said current feeding relay holding said condenser normally short-circuited and other contacts actuated by said current feeding relay for disconnecting said control relay and connecting the current feeding relay to the calling subscriber's line, said signal operating said current feeding relay in response to an answer from the called subscriber's line, a second current feeding relay in each of the said link circuits, and contacts controlled by said slow operating relay for connecting said second current feeding relay to the answering called subscriber's line.

3. An automatic telephone system, according to claim 2, and further comprising two current feeding relays, one for the calling and one for the called subscriber's line, and two condensers, one in each speech wire, for each of said links, one of the said current feeding relays constituting said control relay, contacts on the last mentioned current feeding relay to short-circuit said condensers when the link is connected to a called subscriber's line, and contacts to connect the current feeding relays to the communication when the link is connected to a calling subscriber's line.

References Cited in the file of this patent

UNITED STATES PATENTS

| | | |
|---|---|---|
| 2,535,675 | Goddard | Dec. 26, 1950 |
| 2,594,726 | Burgener | Apr. 29, 1952 |
| 2,815,404 | Nilsson | Dec. 3, 1957 |